United States Patent
Lu

(10) Patent No.: US 10,153,926 B2
(45) Date of Patent: Dec. 11, 2018

(54) FREQUENCY OFFSET ESTIMATION METHOD AND APPARATUS IN OPTICAL TRANSMISSION NETWORK AND STORAGE MEDIUM

(71) Applicant: Sanechips Technology Co.,Ltd., Shenzhen,Guangdong (CN)

(72) Inventor: Qiuyan Lu, Shenzhen (CN)

(73) Assignee: SANECHIPS TECHNOLOGY CO.,LTD., Shenzhen, Guangdong (CN)

(*) Notice: Subject to any disclaimer, the term of this patent is extended or adjusted under 35 U.S.C. 154(b) by 73 days.

(21) Appl. No.: 15/510,754

(22) PCT Filed: Sep. 12, 2014

(86) PCT No.: PCT/CN2014/086444
§ 371 (c)(1),
(2) Date: Apr. 6, 2017

(87) PCT Pub. No.: WO2016/000319
PCT Pub. Date: Jan. 7, 2016

(65) Prior Publication Data
US 2017/0279645 A1    Sep. 28, 2017

(30) Foreign Application Priority Data

Jun. 30, 2014  (CN) .......................... 2014 1 0307156

(51) Int. Cl.
*H04L 27/00*   (2006.01)
(52) U.S. Cl.
CPC .......... *H04L 27/0014* (2013.01); *H04L 27/00* (2013.01); *H04L 2027/0026* (2013.01)

(58) Field of Classification Search
CPC ................ H04B 10/6164; H04B 10/61; H04B 10/2507; H04L 2027/0067;
(Continued)

(56) References Cited

U.S. PATENT DOCUMENTS

| 2004/0066862 | A1  | 4/2004  | Kim |
| 2012/0033965 | A1* | 2/2012  | Zhang ................. H04B 10/611 398/38 |
| 2015/0372766 | A1* | 12/2015 | Yoshida ............. H04B 10/2507 398/193 |

FOREIGN PATENT DOCUMENTS

| CN | 101232480 A | 7/2008 |
| CN | 101883074 A | 11/2010 |

(Continued)

OTHER PUBLICATIONS

International Search Report in international application No. PCT /CN2014/086444, dated Apr. 13, 2015, 2 pgs.
(Continued)

*Primary Examiner* — Vineeta S Panwalkar
(74) *Attorney, Agent, or Firm* — Cooper Legal Group, LLC

(57) ABSTRACT

Disclosed are a frequency offset estimation method and apparatus in an optical transmission network and a storage medium. The method comprises: acquiring a data symbol to be frequency offset estimated, and eliminating a noise phase, a phase generated by a light source and an information phase in the data symbol to be frequency offset estimated; and performing a correlation operation on a data symbol with a set interval in the data symbol after the elimination processing and using a correlation operation result to determine a frequency offset estimation value.

18 Claims, 2 Drawing Sheets

(58) Field of Classification Search
CPC ......... H04L 2027/0026; H04L 27/0014; H04L 27/00; H04L 7/0054
See application file for complete search history.

(56) References Cited

FOREIGN PATENT DOCUMENTS

| | | |
|---|---|---|
| CN | 101917370 A | 12/2010 |
| CN | 102349248 A | 2/2012 |
| CN | 102611671 A | 7/2012 |
| CN | 103095614 A | 5/2013 |

OTHER PUBLICATIONS

English Translation of the Written Opinion of the International Search Authority in international application No. PCT /CN2014/ 086444, dated Apr. 13, 2015, 6 pgs.

\* cited by examiner

FREQUENCY OFFSET ESTIMATION METHOD AND APPARATUS IN OPTICAL TRANSMISSION NETWORK AND STORAGE MEDIUM

TECHNICAL FIELD

The present disclosure generally relates to frequency offset estimation techniques, and more particularly to a frequency offset estimation method and apparatus in optical transmission network and storage medium.

BACKGROUND

A 100 G Digital Signal Processor (DSP) is used for processing data and signals in a 100 G optical module of a 100 G line card, and is a critical component of the 100 G optical module. A frequency offset estimation part is a critical part of the 100 G DSP, and mainly performs frequency offset estimation so as to compensate frequency offsets of signals. Since the 100 G DSP has a processing speed much higher than that of the currently used 40 G DSP, the existing frequency offset estimation techniques, when applied in the 100 G DSP, may have a substantially low processing efficiency.

SUMMARY

In view of the above, an embodiment of the disclosure provides a frequency offset estimation method and apparatus in an optical transmission network and a storage medium with adaptive precision, better real-time performance, and a higher converging speed.

The technical solutions of the embodiment of the disclosure are implemented as follows.

A frequency offset estimation method in an optical transmission network, the method including:

acquiring data symbols on which frequency offset estimation is to be performed;

eliminating a noise phase, a light source generated phase and an information phase of each of the data symbols on which frequency offset estimation is to be performed;

performing a correlation operation on data symbols with a set interval among the data symbols subjected to the eliminating operation; and determining a frequency offset estimation value based on a result of the correlation operation.

According to an embodiment, the eliminating a noise phase, a light source generated phase and an information phase of each of the data symbols on which frequency offset estimation is to be performed, may include:

multiplying a data symbol on which frequency offset estimation is to be performed by a conjugate of the data symbol on which frequency offset estimation is to be performed to get a product, and calculating a fourth power of the product, so as to eliminate the information phase and the light source generated phase of the data symbol on which frequency offset estimation is to be performed; and summing a plurality of successive data symbols on which frequency offset estimation is to be performed, so as to eliminate the noise phases of the data symbols on which frequency offset estimation is to be performed.

According to an embodiment, the correlation operation on data symbols with the set interval is performed according to the following formula:

$$C = 1/N \times \sum_{i=1}^{N} (S_i^* \times S_{i+N}).$$

where N is a symbol interval value between the data symbols on which frequency offset estimation is to be performed $S_i$ and $S_{i+N}$, $\Sigma$ denotes a sum operation, and $S_i^*$ is a conjugate of the data symbol on which frequency offset estimation is to be performed $S_i$.

Correspondingly, the frequency offset estimation value $\Delta f$ is determined according to the following formula:

$$\Delta f = Fs/(2\pi N) \times \arctan(Im(C)/Re(C)).$$

where Fs is a unit data symbol rate, arctan( ) denotes an arctan operation, and Im(C) denotes an imaginary part of the C, and Re(C) denotes a real part of the C.

According to an embodiment, the data symbols on which frequency offset estimation is to be performed may include X polarization state data symbols and Y polarization state data symbols.

The frequency offset estimation values of the Y polarization state data symbols are determined by performing the correlation operation on adjacent data symbols according to the following formula:

$$C = \sum_{i=1}^{N} (S_i^* \times S_{i+1}).$$

For the X polarization state data symbols, the set interval value N varies within a range of 1, 2, 4, 8, 16.

According to an embodiment, the method further may include: for each of the set interval values, setting a threshold corresponding to the set interval value;

determining that phase ambiguity occurs in the X polarization state data symbols, when an absolute value of a difference between a current frequency offset estimation value of the X polarization state data symbols and a current frequency offset estimation value of the Y polarization state data symbols exceeds the threshold corresponding to the set interval value;

adjusting the set interval value N for performing the correlation operation on the X polarization state data symbols to be 1; and continuing to perform frequency offset estimation on the X polarization state data symbols.

According to embodiment, the method further may include:

increasing a current set interval value N in a sequence of 1, 2, 4, 8 and 16, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16;

after N is increased, maintaining the increased current set interval value N to be unchanged, in case that the absolute value of the difference between the current frequency offset estimation value after N is increased and the frequency offset estimation value before N is increased is within a set threshold range and it is determined that the absolute value of the current frequency offset estimation value after N is increased is less than the first threshold; and maintaining the current set interval value N to be 16, in case that the absolute value of the difference between the current frequency offset estimation value and the previous frequency offset estimation value is less than the first threshold and the absolute value of the current frequency offset estimation value exceeds the first threshold, and it is determined that the current set interval value N is 16.

A frequency offset estimation apparatus in an optical transmission network, the apparatus including: an acquisition unit, an elimination unit, a correlation operation unit and a first determination unit; where, the acquisition unit is arranged to acquire data symbols on which frequency offset estimation is to be performed;

the elimination unit is arranged to eliminate a noise phase, a light source generated phase and an information phase of each of the data symbols on which frequency offset estimation is to be performed;

the correlation operation unit is arranged to perform a correlation operation on data symbols with a set interval among the data symbols subjected to the eliminating operation; and the first determination unit is arranged to determine a frequency offset estimation value based on a result of the correlation operation.

According to an embodiment, the elimination unit is further arranged to:

multiply a data symbol on which frequency offset estimation is to be performed by a conjugate of the data symbol on which frequency offset estimation is to be performed to get a product, and calculate a fourth power of the product, so as to eliminate the information phase and the light source generated phase of the data symbol on which frequency offset estimation is to be performed; and sum a plurality of successive data symbols on which frequency offset estimation is to be performed, so as to eliminate the noise phases of the data symbols on which frequency offset estimation is to be performed.

According to an embodiment, the correlation operation unit is further arranged to perform the correlation operation on data symbols with the set interval according to the following formula:

$$C = 1/N \times \sum_{i=1}^{N} (S_i^* \times S_{i+N})$$

where N is a symbol interval value between the data symbols on which frequency offset estimation is to be performed $S_i$ and $S_{i+N}$, $\Sigma$ denotes a sum operation, and $S_i^*$ is a conjugate of the data symbol on which frequency offset estimation is to be performed $S_i$;

Correspondingly, the frequency offset estimation value $\Delta f$ is determined according to the following formula:

$$\Delta f = Fs/(2\pi N) \times \arctan(Im(C)/Re(C))$$

where Fs is a unit data symbol rate, arctan( ) denotes an arctan operation, and Im(C) denotes an imaginary part of the C, and Re(C) denotes a real part of the C.

According to an embodiment, the data symbols on which frequency offset estimation is to be performed may include X polarization state data symbols and Y polarization state data symbols.

The frequency offset estimation values of the Y polarization state data symbols are determined by performing the correlation operation on adjacent data symbols according to the following formula:

$$C = \sum_{i=1}^{N} (S_i^* \times S_{i+1})$$

For the X polarization state data symbols, the set interval value N varies within a range of 1, 2, 4, 8, 16.

According to an embodiment, the apparatus further may include a setting unit and a third determination unit, where, for each of the set interval values, the setting unit is arranged to set a threshold corresponding to the set interval value;

the third determination unit is arranged to determine that phase ambiguity occurs in the X polarization state data symbols, when an absolute value of a difference between a current frequency offset estimation value of the X polarization state data symbols and a current frequency offset estimation value of the Y polarization state data symbols exceeds the threshold corresponding to the set interval value;

Correspondingly, the correlation operation unit is further arranged to:

adjust the set interval value N for performing the correlation operation on the X polarization state data symbols to be 1; and continue to perform frequency offset estimation on the X polarization state data symbols.

According to an embodiment, the apparatus further comprises a fourth determination unit which is arranged to:

increase a current set interval value N in a sequence of 1, 2, 4, 8 and 16, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16;

after N is increased, maintain the increased current set interval value N to be unchanged, in case that the absolute value of the difference between the current frequency offset estimation value after N is increased and the frequency offset estimation value before N is increased is within a set threshold range and it is determined that the absolute value of the current frequency offset estimation value after N is increased is less than the first threshold; and maintain the current set interval value N to be 16, in case that the absolute value of the difference between the current frequency offset estimation value and the previous frequency offset estimation value is less than the first threshold and the absolute value of the current frequency offset estimation value exceeds the first threshold, and it is determined that the current set interval value N is 16.

A storage medium storing computer programs for performing the frequency offset estimation method in the optical transmission network.

According to the embodiments of the disclosure, firstly, data symbols on which frequency offset estimation is to be performed are acquired, and a noise phase, a light source generated phase and an information phase of each of the data symbols on which frequency offset estimation is to be performed are eliminated. A correlation operation is performed on data symbols with a set interval among the data symbols subjected to the eliminating operation. A frequency offset estimation value is determined based on a result of the correlation operation. Frequency offset compensation is performed on the data symbols based on the determined frequency offset estimation value. According to the embodiments of the disclosure, the noise phases, the light source generated phases and the information phases of the data symbols are eliminated, thus increasing accuracy of the frequency offset estimation; further, an interval between the data symbols on which frequency offset estimation is performed can be adjusted based on the current frequency offset estimation result, and thus precision of the frequency offset estimation may be adjusted dynamically. The embodiments of the disclosure provide a technical solution of frequency offset estimation with adaptive precision, better real-time performance, and a higher converging speed. Therefore, the technical solution can be better applied to the 100 G digital signal processor, and can also be applied to an optical signal processor with a higher processing speed.

DETAILED DESCRIPTION

In order to make the object, technical solution and advantages of the present disclosure to be more clear, embodiments of the disclosure will be described in conjunction with the appended drawings in the following. It should be noted that, embodiments of the disclosure and features thereof may be arbitrarily combined without conflictions.

Figure 1:
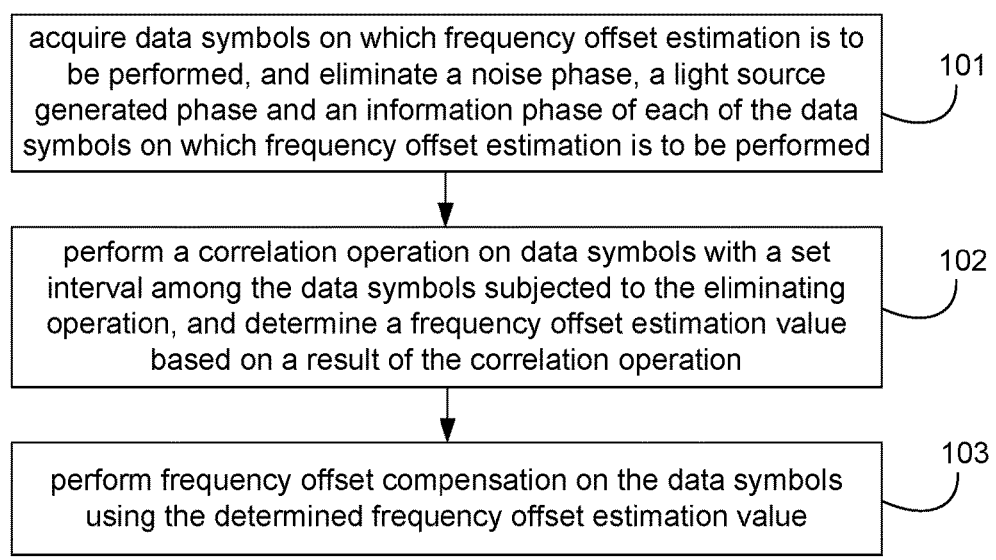
FIG. 1 is a flowchart of a frequency offset estimation method in an optical transmission network according to an embodiment of the disclosure.

FIG. 1 is a flowchart of a frequency offset estimation method in an optical transmission network according to an embodiment of the disclosure. As shown in FIG. 1, the frequency offset estimation method in the optical transmission network in the embodiment includes the following steps.

In Step 101, data symbols on which frequency offset estimation is to be performed are acquired, and a noise phase, a light source generated phase and an information phase of each of the data symbols on which frequency offset estimation is to be performed are eliminated.

Here, the data symbols on which frequency offset estimation is to be performed may be currently received data symbols, or may be data symbols sent out. In this embodiment, the data symbols refer to optical network signals.

According to the embodiment of the disclosure, a phase of a data symbol $S_k$ may be expressed as $\theta_k = \theta_s(k) + \Delta\omega KT_i + \theta_N + \theta_{ASE}$, where $\theta_s(k)$ is an information phase, $\theta_N$ is a phase introduced by a laser line width, $\theta_{ASE}$ is a noise phase, and $\Delta\omega KT_i$ is a frequency offset phase. The value of $\theta_s(k)$ may be selected from $0, \pi, \pm\pi/2$. A data symbol $S_k$ is multiplied by a conjugate of a data symbol $S_{k-N}$ having a set interval with the data symbol $S_k$ to get a product, and a fourth power of the product is calculated, so as to eliminate the information phase of the $S_k$ and the phase (i.e., the light source generated source) introduced by the laser line width. Multiple successive data symbols are summed so as to eliminate the noise phases of the data symbols. According to the embodiment of the disclosure, since the noise phases of the data symbols oscillate about 0 phase, the sum of the noise phases of the multiple successive data symbols is close to 0, and thus the noise phases of the data symbols can be eliminated.

In Step 102, a correlation operation is performed on data symbols with a set interval among the data symbols subjected to the eliminating operation, and a frequency offset estimation value is determined based on a result of the correlation operation.

The correlation operation is performed on the data symbols with a set interval according to the following formula:

$$C = 1/N \times \sum_{i=1}^{N} (S_i^* \times S_{i+N})$$

where N is a symbol interval between the data symbols on which frequency offset estimation is to be performed $S_i$ and $S_{i+N}$, $\Sigma$ denotes a sum operation, and $S_i^*$ is a conjugate of the data symbol on which frequency offset estimation is to be performed $S_i$.

Correspondingly, the frequency offset estimation value $\Delta f$ is determined according to the following formula:

$$\Delta f = Fs/(2\pi N) \times \arctan(Im(C)/Re(C))$$

where Fs is a unit data symbol rate, arctan( ) denotes an arctan operation, and Im(C) denotes an imaginary part of the C, and Re(C) denotes a real part of the C.

According to the embodiment of the disclosure, the data symbols on which frequency offset estimation is to be performed may include X polarization state data symbols and Y polarization state data symbols.

The frequency offset estimation values of the Y polarization state data symbols are determined by performing the correlation operation on adjacent data symbols according to the following formula:

$$C = \sum_{i=1}^{N} (S_i^* \times S_{i+1}).$$

For the X polarization state data symbols, the set interval value N may be one of 1, 2, 4, 8, 16.

According to the embodiment of the disclosure, for each of the set interval values, the following steps may be performed.

A threshold corresponding to the set interval value is set.

When an absolute value of a difference between a current frequency offset estimation value of the X polarization state data symbols and a current frequency offset estimation value of the Y polarization state data symbols exceeds the threshold corresponding to the set interval value, it is determined that phase ambiguity occurs in the X polarization state data symbols. The set interval value N for performing the correlation operation on the X polarization state data symbols is adjusted to be 1. Frequency offset estimation continues to be performed on the X polarization state data symbols.

According to the embodiment of the disclosure, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16, a current set interval value N is increased in a sequence of 1, 2, 4, 8 and 16.

After N is increased, in case that the absolute value of the difference between the current frequency offset estimation value after N is increased and the frequency offset estimation value before N is increased is within a set threshold range and it is determined that the absolute value of the increased current frequency offset estimation value after N is increased is less than the first threshold, the increased current set interval value N is maintained to be unchanged.

In case that the absolute value of the difference between the current frequency offset estimation value and the previous frequency offset estimation value is less than the first threshold and the absolute value of the current frequency offset estimation value exceeds the first threshold, and it is determined that the current set interval value N is 16, the current set interval value N is maintained to be 16.

In Step 103, frequency offset compensation is performed on the data symbols based on the determined frequency offset estimation value.

After the frequency offset estimation value is determined, frequency offset compensation can be performed on the data symbols.

The technical solutions of the embodiment of the disclosure may be further explained in the following examples.

Figure 2:
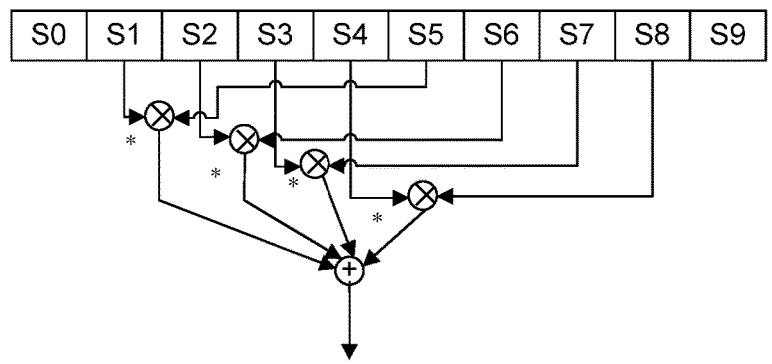
FIG. 2 is a schematic diagram of frequency offset estimation on data symbols according to an embodiment of the disclosure.

According to the embodiment of the disclosure, a frequency offset is estimated based on a phase difference between two correlated data symbols. The phase difference is obtained by performing correlation operation on data symbols adjacent to each other or with an interval. As shown in FIG. 2, the correlation output formula is $$C = 1/N \times \sum_{i=1}^{N} (S_i^* \times S_{i+N}).$$

A phase of a correlation output result is gotten and is divided by the data symbol interval so as to obtain an average angle frequency offset: $\Delta f = Fs/(2\pi N) \times \arctan(\text{Im}(C)/\text{Re}(C))$, where Fs is the unit data symbol rate, N is the data symbol interval between the $S_i$ and $S_{i+N}$. Due to $-\pi \le \arctan(\text{Im}(C)/\text{Re}(C)) \le \pi$, a frequency offset estimation range is $[-Fs/2N, Fs/2N]$ when the Fs is fixed.

In a 100 G optical network system, the data rate for the frequency offset estimation Fs=32 G, and the data symbols include X polarization state data symbols and Y polarization state data symbols. When a transceiver adopts Quadrature Phase Shift Keying (QPSK) modulation/Differential Quadrature Reference Phase Shift Keying (DQPSK) modulation, a phase of the data symbol $S_k$ may be expressed as $\theta_k = \theta_s(k) + \Delta\omega KT_i + \theta_N + \theta_{ASE}$, $\theta_s(k)$ is an information phase, $\theta_N$ is a phase introduced by a laser line width, $\theta_{ASE}$ is a noise phase, and $\Delta\omega KT_i$ is a frequency offset phase. The value of the $\theta_s(k)$ may be selected from $0, \pi, \pm\pi/2$. A data symbol $S_k$ is multiplied by a conjugate of a data symbol $S_{k-N}$ to get a product, and a fourth power of the product is calculated, so as to eliminate the information phase and the phase introduced by the laser line width. Multiple successive data symbols are summed so as to eliminate the noise phases of the data symbols. The frequency offset estimation method as shown in FIG. 2 may be performed on the data symbols subjected to the phase eliminating operation to get a frequency offset estimation result. The frequency offset estimation result is divided by 4 (an angle value calculated by the arctan operation quadruples the true angle value because of the effect of the fourth power operation) to get the frequency offset estimation value $\Delta\omega T_i$. Since the fourth power operation will quadruple the original frequency offset phase, the estimated phase needs to be divided by 4.

Since a phase of an exponent is within $[-\pi, \pi]$, it can be determined that phase ambiguity occurs in case that the frequency offset phase exceeds $\pm\pi/4$. According to the embodiment of the disclosure, in order to obtain precise frequency offset estimation and a low possibility of phase ambiguity, a corresponding frequency offset estimation process may be performed in case that phase ambiguity occurs, and the details of the process will be described in the following.

When a compensation value for a frequency offset output by a loop is close to a real value of the frequency offset, a remaining frequency offset in the data subjected to the frequency offset compensation is very small. A current data $X_k$ is multiplied by a conjugate $X_{k-1}^*$ of a previous data having an interval N=1 with the current data, i.e., $X_k X_{k-1}^*$, so as to obtain a phase difference between current data and the previous data. Since the proportion of the frequency offset phase is small when N=1, the N may be increased so as to increase a precision of the estimation. In this way, the frequency offset phase difference between the $S_k$ and $S_{k-N}$ is increased by a factor of N, and the range of the frequency offset estimation is decreased by the factor of N.

A difference $|\Delta\theta_k - \Delta\theta_{k-1}|$ between two adjacent frequency offset estimation angle values, and an absolute value $|\theta_e|$ of the frequency offset estimation value may be taken as a condition for determining whether the set interval N of the data symbols is jumped. When the loop meets a condition of $|\Delta\theta_k - \Delta\theta_{k-1}| < 0.0005$ (0.0005 is in units of radians, and an angle value hereinafter is in units of radians), and $|\theta_e| < 0.01$, the N is increased in a sequence of 1, 2, 4, 8 and 16. For example, N is increased from 1 to 2, or N is increased from 2 to 4.

After N is increased, in case that $|\Delta\theta_k - \Delta\theta_{k-1}|$ is within [0.0005, 0.05] and $|\theta_e| < 0.01$, it indicates that a second-order loop is during a process of stabilization. N will not be changed until an output of the second-order loop is stabilized at a more precise frequency offset value, i.e., $|\Delta\theta_k - \Delta\theta_{k-1}| < 0.0005$. Then N continues to increase until N=16.

When the second-order loop meets $|\Delta\theta_k - \Delta\theta_{k-1}| > 0.05$ or $|\theta_e| > 0.05$, it indicates that a frequency offset of an input data is changed sharply, and then N is reset to be 1. Thereafter, the above process is repeated.

According to the technical solutions of the embodiment of the disclosure, when Fs=32 Ghz, in case that N=1, a larger frequency offset estimation range [−4 Ghz, 4 Ghz] can be obtained (a fourth power operation is considered). In case that N=16, a frequency offset estimation range is [−250 Mhz, 250 Mhz], and a higher frequency offset estimation precision can be obtained.

For a fourth power operation on a conjugate product of two data symbols with an interval N, in case that an absolute value of a difference between angle values of the two data symbols is larger than $\pi/4$, for example, $\pi/4+0.1$, it is determined that phase ambiguity occurs. If the interval between data symbols meets N=16, phase ambiguity occurs and an angle offset value is $\pi/32$. If the interval between data symbols meets N=8, the angle offset value is $\pi/16$. The angel offset values when N=2, 4 may be derived in a same manner.

In this possible case, frequency offset estimation values of the X polarization state data symbols and the Y state polarization data symbols are calculated respectively. For the fourth power operation on the frequency offset estimation value of the X polarization state data symbols, the interval N is dynamically adjusted based on a frequency offset stabilization condition, and the maximum of the N is 16. For the fourth power operation on the frequency offset estimation value of the Y polarization state data symbols, the interval N is always 1, i.e., a phase difference between adjacent data symbols is always calculated. For the Y polarization state data symbols, the phase ambiguity may occur only when the frequency offset of the input data is suddenly increased by more than $\pi/4$. This phase ambiguity can be eliminated by detection of a frame synchronization module and thus will not be considered herein. That is, it is assumed that phase ambiguity will not occur for the Y polarization state data symbols.

Since in the frequency offset estimation for the X polarization state, the interval value N can be adjusted dynamically, the precision of the frequency offset estimation for the X polarization state may be adaptive. The frequency offset compensation value for the X polarization state is used to compensate input data of X path corresponding to the X polarization state and Y path corresponding to the Y polarization state. In the frequency offset estimation for Y polarization state, N is always 1, and is used to eliminate the phase ambiguity in the frequency offset estimation for the X path. When the frequency offset estimation for the X polarization state is in a stabilized sate (i.e., the N=16), and a difference between frequency offset estimation values output by the X path and Y path ≤0.1, that is, an absolute value of a difference between an current frequency offset estimation value of the X polarization state data symbols and an current frequency offset estimation value of the Y polarization state data symbols ≤0.1, it is assumed that phase ambiguity occurs in the X path. When N=8, and the difference between frequency offset estimation values output by the X path and Y path ≤0.2, that is, the absolute value of the difference between an current frequency offset estimation value of the X polarization state data symbols and an current frequency offset estimation value of the Y polarization state data symbols ≥0.2, it is assumed that phase ambiguity occurs in the X path. In a same manner, thresholds for judging whether phase ambiguity occurs in the X path when N=2, 4 can be obtained (in general, it is judged whether phase ambiguity occurs when N=16). When phase ambiguity occurs in the X path, the interval N for the X path is reset to be 1 and the frequency offset estimation for the X path is restarted.

Figure 3:
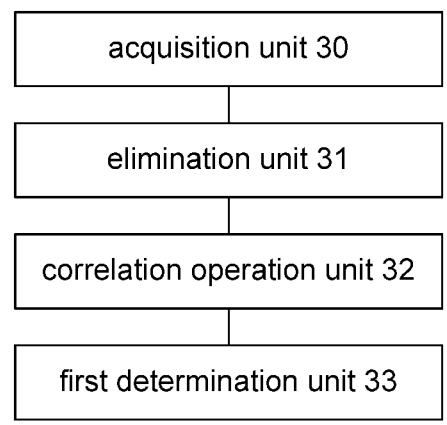
FIG. 3 is a schematic compositional structure diagram of a frequency offset estimation apparatus in an optical transmission network according to an embodiment of the disclosure.

FIG. 3 is a schematic compositional structure diagram of a frequency offset estimation apparatus in an optical transmission network according to an embodiment of the disclosure. As shown in FIG. 3, the frequency offset estimation apparatus in the optical transmission network according to the embodiment of the disclosure includes: an acquisition unit 30, an elimination unit 31, a correlation operation unit 32 and a first determination unit 33.

The acquisition unit 30 is arranged to acquire data symbols on which frequency offset estimation is to be performed.

The elimination unit 31 is arranged to eliminate a noise phase, a light source generated phase and an information phase of each of the data symbols on which frequency offset estimation is to be performed.

The correlation operation unit 32 is arranged to perform a correlation operation on data symbols with a set interval among the data symbols subjected to the eliminating operation.

The first determination unit 33 is arranged to determine a frequency offset estimation value based on a result of the correlation operation.

The elimination unit 31 is further arranged to: multiply a data symbol on which frequency offset estimation is to be performed by a conjugate of the data symbol on which frequency offset estimation is to be performed to get a product, and calculate a fourth power of the product, so as to eliminate the information phase and the light source generated phase of the data symbol on which frequency offset estimation is to be performed; and sum a plurality of successive data symbols on which frequency offset estimation is to be performed, so as to eliminate the noise phases of the data symbols on which frequency offset estimation is to be performed.

The correlation operation unit 32 is further arranged to perform the correlation operation on data symbols with the set interval according to the following formula:

$$C = 1/N \times \sum_{i=1}^{N}(S_i^* \times S_{i+N})$$

where N is a symbol interval value between the data symbols on which frequency offset estimation is to be performed $S_i$ and $S_{i+N}$, $\Sigma$ denotes a sum operation, and $S_i^*$ is a conjugate of the data symbol on which frequency offset estimation is to be performed $S_i$.

Correspondingly, the first determination unit 33 is further arranged to determine the frequency offset estimation value $\Delta f$ according to the following formula:

$$\Delta f = Fs/(2\pi N) \times \arctan(Im(C)/Re(C))$$

where Fs is a unit data symbol rate, arctan( ) denotes an arctan operation, and Im(C) denotes an imaginary part of the C, and Re(C) denotes a real part of the C.

According to the embodiment of the disclosure, the data symbols on which frequency offset estimation is to be performed may include X polarization state data symbols and Y polarization state data symbols.

The correlation operation unit 32 is further arranged to determine the frequency offset estimation values of the Y polarization state data symbols by performing the correlation operation on adjacent data symbols according to the following formula:

$$C = \sum_{i=1}^{N}(S_i^* \times S_{i+1})$$

For the X polarization state data symbols, the set interval value N is variable, which can be selected from 1, 2, 4, 8, 16.

Based on the frequency offset estimation apparatus in the optical transmission network as shown in FIG. 3, the frequency offset estimation apparatus in the optical transmission network according to the embodiment of the disclosure may further include a setting unit (not shown in FIG. 3) and a third determination unit (not shown in FIG. 3).

The setting unit is arranged to set a threshold corresponding to the set interval value.

The third determination unit is arranged to determine that phase ambiguity occurs in the X polarization state data symbols, when an absolute value of a difference between a current frequency offset estimation value of the X polarization state data symbols and a current frequency offset estimation value of the Y polarization state data symbols exceeds the threshold corresponding to the set interval value.

Correspondingly, the correlation operation unit 32 is further arranged to: adjust the set interval value N for performing the correlation operation on the X polarization state data symbols to be 1, and continue to perform frequency offset estimation on the X polarization state data symbols.

Based on the frequency offset estimation apparatus in the optical transmission network as shown in FIG. 3, the frequency offset estimation apparatus in the optical transmission network according to the embodiment of the disclosure may further include a fourth determination unit (not shown in FIG. 3).

The fourth determination unit is arranged to:

increase a current set interval value N in a sequence of 1, 2, 4, 8 and 16, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16;

after N is increased, maintain the increased current set interval value N to be unchanged, in case that the absolute value of the difference between the increased current frequency offset estimation value and the frequency offset estimation value previous to the increasing is within a set threshold range and it is determined that the absolute value of the increased current frequency offset estimation value is less than the first threshold; and maintain the current set interval value N to be 16, in case that the absolute value of the difference between the current frequency offset estimation value and the previous frequency offset estimation value is less than the first threshold and the absolute value of the current frequency offset estimation value exceeds than the first threshold, and it is determined that the current set interval value N is 16.

The skilled in the art should understand that, the second determination unit, the third determination unit and the fourth determination unit are not essential technical features for implementing the basic technical solutions of the embodiment of the disclosure, but are provided for optimizing the technical solutions of the embodiment of the disclosure.

The skilled in the art should understand that, the functions of processing units of the frequency offset estimation apparatus in the optical transmission network according to the embodiment of the disclosure, may be understood by referring to the description of the frequency offset estimation method in the optical transmission network. The processing units of the frequency offset estimation apparatus in the optical transmission network according to the embodiment of the disclosure, may be implemented as analogy circuits for performing the functions according to the embodiment of the disclosure, or may be implemented by software, running on a smart apparatus, for performing the functions according to the embodiment of the disclosure.

An embodiment of the disclosure further provides a storage medium. The storage medium stores computer programs for performing the frequency offset estimation method in the optical transmission network according to the embodiments.

It should be understood that, in the embodiments of the disclosure, the disclosed method and smart apparatus may be implemented in other ways. The apparatus described above is merely exemplary. For example, the division of the units is merely a logic division, and in practice, may have other divisions. For example, multiple units or assemblies may be combined or integrated into another system, and some features may be omitted or not implemented. In additional, coupling, direct coupling or communication connection between the shown or discussed components may be implemented via some interfaces, apparatus or units, and may be electrical, mechanical or other forms.

The units explained as separate components may be physically separated from each other or not. A component shown as a unit may be a physical unit or not, that is, may be located at one place or may be distributed over multiple network units. Some or all of the units may be selected as required to achieve the object of the technical solution of the embodiment.

In addition, the functional units of the embodiments of the disclosure may be integrated in a single processing unit, or may be each implemented as a single unit. Two or more of the functional units may be integrated in a single processing unit. The integrated unit may be implemented as hardware or may be implemented as a combination of hardware and software.

The skilled in the art should understand that, some or all of steps for implementing the embodiment of the method may be performed via hardware related to a program which may be stored in a computer-readable storage medium. The program, when executed, performs the steps of the embodiment of the method. The storage medium may include a removable storage device, a Read-Only Memory (ROM), a Random Access Memory (RAM), a magnetic disk or an optical disk or other mediums which can store program codes.

Alternatively, the integrated unit of the embodiment of the disclosure, when implemented in software functional module and sold or used as a stand-alone product, may be stored in a computer-readable storage medium. In view of this, Essence or the contribution to the related art of the technical solutions of the embodiments of the disclosure may be embodied in a software product. The software product is stored in a storage medium and includes several instructions which cause a computer device (may be a personal computer, a server, a network device or the like) to perform some or all of the method according to an embodiment of the disclosure. The storage medium may include a removable storage device, a Read-Only Memory (ROM), a Random Access Memory (RAM), a magnetic disk or an optical disk or other mediums which can store program codes.

The described above are merely embodiments of the disclosure, and the disclosure is not limited thereto. Modifications or replacements without departing from the scope of the disclosure, easily envisaged by the skilled in the art, may fall within the protection scope of the disclosure.

INDUSTRIAL APPLICABILITY

The disclosure provides frequency offset estimation with adaptive precision, better real-time performance, and a higher converging speed. Therefore, the frequency offset estimation can be better applied to the 100 G digital signal processor, and can also be applied to an optical signal processor with a higher processing speed.

What is claimed is:

1. A frequency offset estimation method in an optical transmission network, the method comprising:
   acquiring data symbols on which frequency offset estimation is to be performed;
   eliminating a noise phase, a light source generated phase and an information phase of each of the data symbols on which frequency offset estimation is to be performed;
   performing a correlation operation on data symbols with a set interval among the data symbols subjected to the eliminating operation; and determining a frequency offset estimation value based on a result of the correlation operation.

2. The method according to claim 1, wherein the eliminating a noise phase, a light source generated phase and an information phase of each of the data symbols on which frequency offset estimation is to be performed comprises:
   multiplying a data symbol on which frequency offset estimation is to be performed by a conjugate of the data symbol on which frequency offset estimation is to be performed to get a product, and calculating a fourth power of the product, so as to eliminate the information phase and the light source generated phase of the data symbol on which frequency offset estimation is to be performed; and
   summing a plurality of successive data symbols on which frequency offset estimation is to be performed, so as to eliminate the noise phases of the data symbols on which frequency offset estimation is to be performed.

3. The method according to claim 1, wherein the correlation operation on data symbols with the set interval is performed according to the following formula $$C = 1/N \times \sum_{i=1}^{N} (S_i^* \times S_{i+N})$$

wherein N is a symbol interval value between the data symbols on which frequency offset estimation is to be performed $S_i$ and $S_{i+N}$, $\Sigma$ denotes a sum operation, and $S_i^*$ is a conjugate of the data symbol on which frequency offset estimation is to be performed $S_i$;
correspondingly, the frequency offset estimation value $\Delta f$ is determined according to the following formula:

$$\Delta f = Fs/(2\pi N) \times \arctan(Im(C)/Re(C))$$

wherein Fs is a unit data symbol rate, arctan( ) denotes an arctan operation, and Im(C) denotes an imaginary part of the C, and Re(C) denotes a real part of the C.

4. The method according to claim 3, wherein the data symbols on which frequency offset estimation is to be performed comprises X polarization state data symbols and Y polarization state data symbols;
   wherein the frequency offset estimation values of the Y polarization state data symbols are determined by performing the correlation operation on adjacent data symbols according to the following formula:

$$C = \sum_{i=1}^{N} (S_i^* \times S_{i+1})$$

for the X polarization state data symbols, the set interval value N varies within a range of 1, 2, 4, 8, 16.

5. The method according to claim 4, wherein the method further comprises: for each of the set interval values,
   setting a threshold corresponding to the set interval value;
   determining that phase ambiguity occurs in the X polarization state data symbols, when an absolute value of a difference between a current frequency offset estimation value of the X polarization state data symbols and a current frequency offset estimation value of the Y polarization state data symbols exceeds the threshold corresponding to the set interval value;
   adjusting the set interval value N for performing the correlation operation on the X polarization state data symbols to be 1; and
   continuing to perform frequency offset estimation on the X polarization state data symbols.

6. The method according to claim 4, wherein the method further comprises:
   increasing a current set interval value N in a sequence of 1, 2, 4, 8 and 16, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16;
   after N is increased, maintaining the increased current set interval value N to be unchanged, in case that the absolute value of the difference between the current frequency offset estimation value after N is increased and the frequency offset estimation value before N is increased is within a set threshold range and it is determined that the absolute value of the current frequency offset estimation value after N is increased is less than the first threshold; and
   maintaining the current set interval value N to be 16, in case that the absolute value of the difference between the current frequency offset estimation value and the previous frequency offset estimation value is less than the first threshold and the absolute value of the current frequency offset estimation value exceeds the first threshold, and it is determined that the current set interval value N is 16.

7. A frequency offset estimation apparatus in an optical transmission network, the apparatus is applied into a 100 G Digital Signal Processor and comprises: a processor configured to execute operations comprising:
   acquiring data symbols on which frequency offset estimation is to be performed;
   eliminating a noise phase, a light source generated phase and an information phase of each of the data symbols on which frequency offset estimation is to be performed;
   performing a correlation operation on data symbols with a set interval among the data symbols subjected to the eliminating operation; and
   determining a frequency offset estimation value based on a result of the correlation operation.

8. The apparatus according to claim 7, wherein the processor further executes operations comprising:
   multiplying a data symbol on which frequency offset estimation is to be performed by a conjugate of the data symbol on which frequency offset estimation is to be performed to get a product, and calculating a fourth power of the product, so as to eliminate the information phase and the light source generated phase of the data symbol on which frequency offset estimation is to be performed; and
   summing a plurality of successive data symbols on which frequency offset estimation is to be performed, so as to eliminate the noise phases of the data symbols on which frequency offset estimation is to be performed.

9. The apparatus according to claim 7, wherein the processor further executes operations comprising: performing the correlation operation on data symbols with the set interval according to the following formula:

$$C = 1/N \times \sum_{i=1}^{N} (S_i^* \times S_{i+N})$$

wherein N is a symbol interval value between the data symbols on which frequency offset estimation is to be performed $S_i$ and $S_{i+N}$, Σ denotes a sum operation, and $S_i^*$ is a conjugate of the data symbol on which frequency offset estimation is to be performed $S_i$;

correspondingly, the processor further executes operations comprising: determining the frequency offset estimation value Δf according to the following formula:

Δf=Fs/(2πN)×arctan(Im(C)/Re(C))

wherein Fs is a unit data symbol rate, arctan( ) denotes an arctan operation, and Im(C) denotes an imaginary part of the C, and Re(C) denotes a real part of the C.

10. The apparatus according to claim 9, wherein the data symbols on which frequency offset estimation is to be performed comprises X polarization state data symbols and Y polarization state data symbols;
wherein the processor determines the frequency offset estimation values of the Y polarization state data symbols by performing the correlation operation on adjacent data symbols according to the following formula:

$$C = \sum_{i=1}^{N} (S_i^* \times S_{i+1})$$

for the X polarization state data symbols, the set interval value N varies within a range of 1, 2, 4, 8, 16.

11. The apparatus according to claim 10, wherein the processor further executes operations comprising: for each of the set interval values,
setting a threshold corresponding to the set interval value;
determining that phase ambiguity occurs in the X polarization state data symbols, when an absolute value of a difference between a current frequency offset estimation value of the X polarization state data symbols and a current frequency offset estimation value of the Y polarization state data symbols exceeds the threshold corresponding to the set interval value;
correspondingly, the processor further executes operations comprising:
adjusting the set interval value N for performing the correlation operation on the X polarization state data symbols to be 1; and
continuing to perform frequency offset estimation on the X polarization state data symbols.

12. The apparatus according to claim 11, wherein the processor further executes operations comprising:
increasing a current set interval value N in a sequence of 1, 2, 4, 8 and 16, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16;
after N is increased, maintaining the increased current set interval value N to be unchanged, in case that the absolute value of the difference between the current frequency offset estimation value after N is increased and the frequency offset estimation value before N is increased is within a set threshold range and it is determined that the absolute value of the current frequency offset estimation value after N is increased is less than the first threshold; and
maintaining the current set interval value N to be 16, in case that the absolute value of the difference between the current frequency offset estimation value and the previous frequency offset estimation value is less than the first threshold and the absolute value of the current frequency offset estimation value exceeds than the first threshold, and it is determined that the current set interval value N is 16.

13. A non-transitory storage medium storing computer programs for performing a frequency offset estimation method in the optical transmission network, the method comprising:
acquiring data symbols on which frequency offset estimation is to be performed;
eliminating a noise phase, a light source generated phase and an information phase of each of the data symbols on which frequency offset estimation is to be performed;
performing a correlation operation on data symbols with a set interval among the data symbols subjected to the eliminating operation; and
determining a frequency offset estimation value based on a result of the correlation operation.

14. The non-transitory storage medium according to claim 13, wherein the eliminating a noise phase, a light source generated phase and an information phase of each of the data symbols on which frequency offset estimation is to be performed comprises:
multiplying a data symbol on which frequency offset estimation is to be performed by a conjugate of the data symbol on which frequency offset estimation is to be performed to get a product, and calculating a fourth power of the product, so as to eliminate the information phase and the light source generated phase of the data symbol on which frequency offset estimation is to be performed; and
summing a plurality of successive data symbols on which frequency offset estimation is to be performed, so as to eliminate the noise phases of the data symbols on which frequency offset estimation is to be performed.

15. The non-transitory storage medium according to claim 13, wherein the correlation operation on data symbols with the set interval is performed according to the following formula:

$$C = 1/N \times \sum_{i=1}^{N} (S_i^* \times S_{i+N})$$

wherein N is a symbol interval value between the data symbols on which frequency offset estimation is to be performed $S_i$ and $S_{i+N}$, Σ denotes a sum operation, and $S_i^*$ is a conjugate of the data symbol on which frequency offset estimation is to be performed $S_i$;

correspondingly, the frequency offset estimation value Δf is determined according to the following formula:

Δf=Fs/(2πN)×arctan(Im(C)/Re(C))

wherein Fs is a unit data symbol rate, arctan( ) denotes an arctan operation, and Im(C) denotes an imaginary part of the C, and Re(C) denotes a real part of the C.

16. The non-transitory storage medium according to claim 15, wherein the data symbols on which frequency offset estimation is to be performed comprises X polarization state data symbols and Y polarization state data symbols;

wherein the frequency offset estimation values of the Y polarization state data symbols are determined by performing the correlation operation on adjacent data symbols according to the following formula:

$$C = \sum_{i=1}^{N} (S_i^* \times S_{i+1})$$

for the X polarization state data symbols, the set interval value N varies within a range of 1, 2, 4, 8, 16.

17. The non-transitory storage medium according to claim 16, wherein the method further comprises: for each of the set interval values, setting a threshold corresponding to the set interval value;

determining that phase ambiguity occurs in the X polarization state data symbols, when an absolute value of a difference between a current frequency offset estimation value of the X polarization state data symbols and a current frequency offset estimation value of the Y polarization state data symbols exceeds the threshold corresponding to the set interval value;

adjusting the set interval value N for performing the correlation operation on the X polarization state data symbols to be 1; and continuing to perform frequency offset estimation on the X polarization state data symbols.

18. The non-transitory storage medium according to claim 16, wherein the method further comprises:

increasing a current set interval value N in a sequence of 1, 2, 4, 8 and 16, in case that an absolute value of a difference between the current frequency offset estimation value and a previous frequency offset estimation value is less than a first threshold and an absolute value of the current frequency offset estimation value is less than the first threshold, and it is determined that the current set interval value N is not 16;

after N is increased, maintaining the increased current set interval value N to be unchanged, in case that the absolute value of the difference between the current frequency offset estimation value after N is increased and the frequency offset estimation value before N is increased is within a set threshold range and it is determined that the absolute value of the current frequency offset estimation value after N is increased is less than the first threshold; and maintaining the current set interval value N to be 16, in case that the absolute value of the difference between the current frequency offset estimation value and the previous frequency offset estimation value is less than the first threshold and the absolute value of the current frequency offset estimation value exceeds the first threshold, and it is determined that the current set interval value N is 16.

* * * * *